INVENTORS.
Kenneth H. Nimerick
Jerry L. White

Dec. 16, 1969   K. H. NIMERICK ET AL   3,483,927
SELECTIVE TEMPORARY SEALING OF A FLUID-BEARING
ZONE IN A GEOLOGIC FORMATION
Filed Aug. 23, 1968   5 Sheets-Sheet 5

INVENTORS.
Kenneth H. Nimerick
BY Jerry L. White

ATTORNEY

United States Patent Office 3,483,927
Patented Dec. 16, 1969

3,483,927
SELECTIVE TEMPORARY SEALING OF A FLUID-
BEARING ZONE IN A GEOLOGIC FORMATION
Kenneth H. Nimerick and Jerry L. White, Tulsa, Okla.,
assignors to The Dow Chemical Company, Midland,
Mich., a corporation of Delaware
Filed Aug. 23, 1968, Ser. No. 754,777
Int. Cl. E21b 33/13
U.S. Cl. 166—294                                    6 Claims

ABSTRACT OF THE DISCLOSURE

The invention contemplates a method of selective plugging of passageways leading into oil zones by the expedient of injecting a two-phase emulsion, having a polymer latex as the discontinuous phase, into the passageways which causes the oil in contact therewith to gel temporarily and thereby plug off the zone but which gel shortly thereafter liquefies and dissipates, thus protecting the zone for a desirable time against entrance of the permanent plugging composition but which has not a lasting effect upon the permeability of the producing zone. The efficacy of the invention may be enhanced by flushing out the gelled composition when its presence as a plugging agent is no longer desired by circulating a low viscosity organic liquid through the portion of the producing zone affected by the plug.

---

Figure 1:
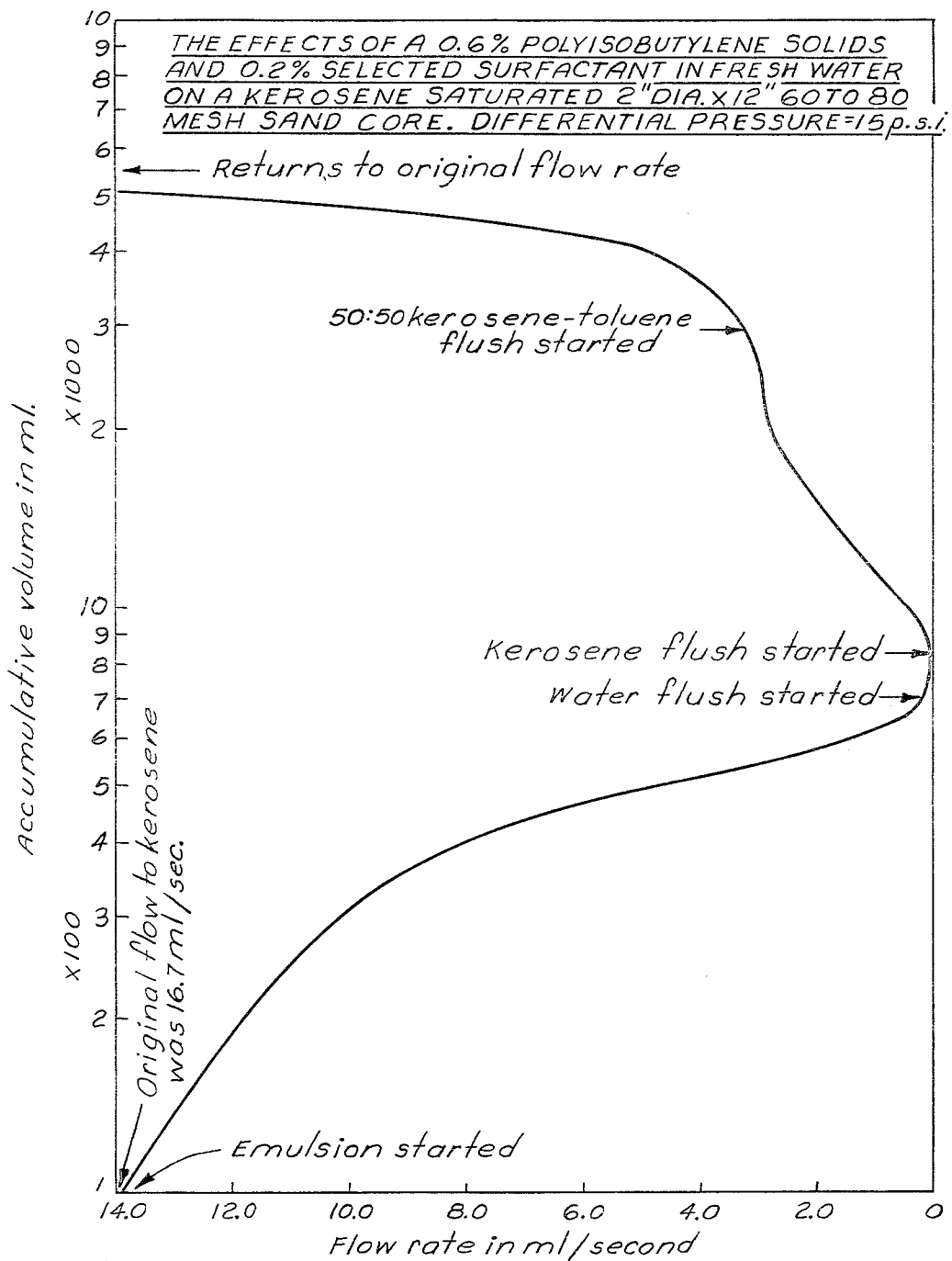
Figure 2:
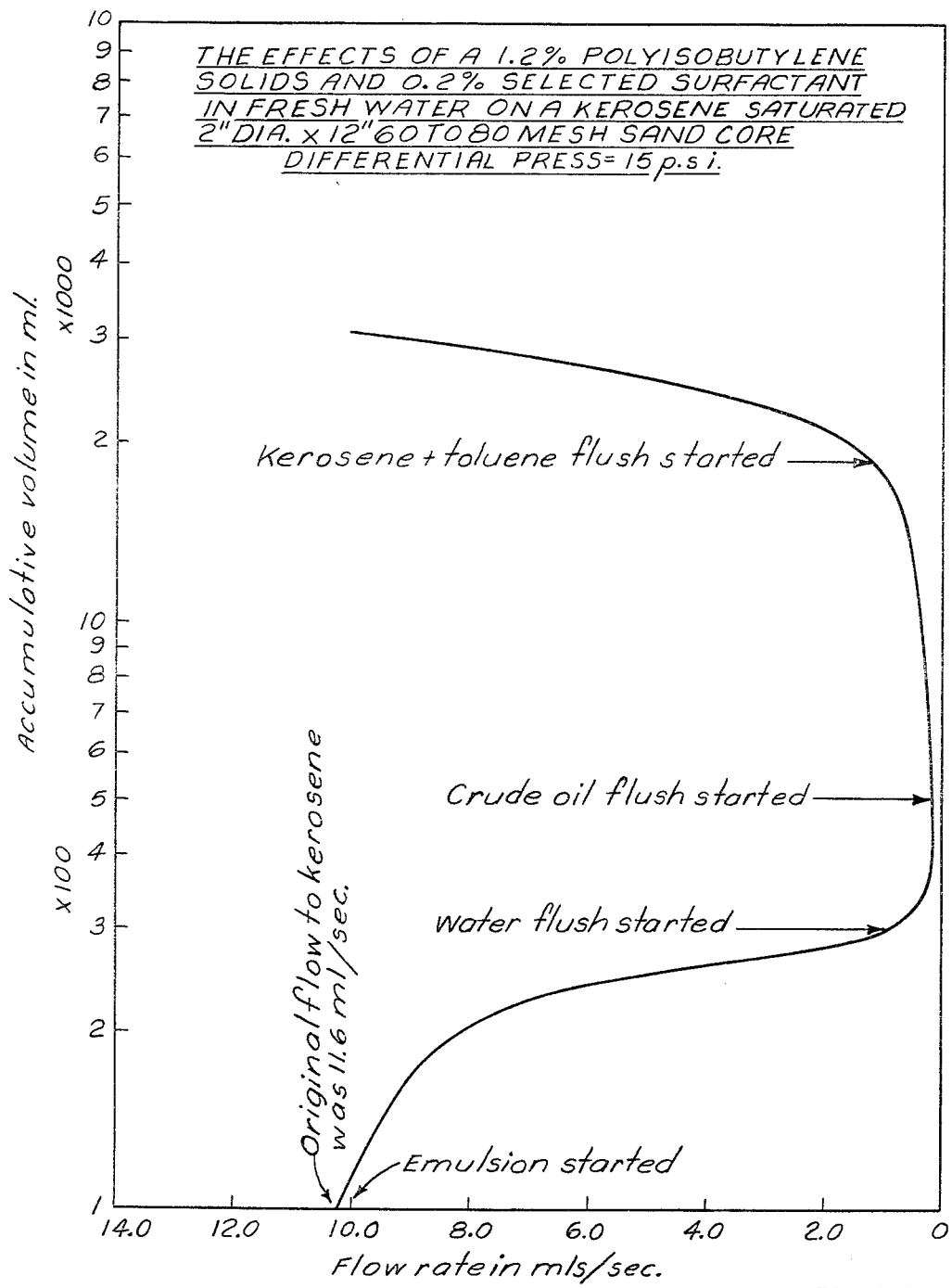
Figure 3:
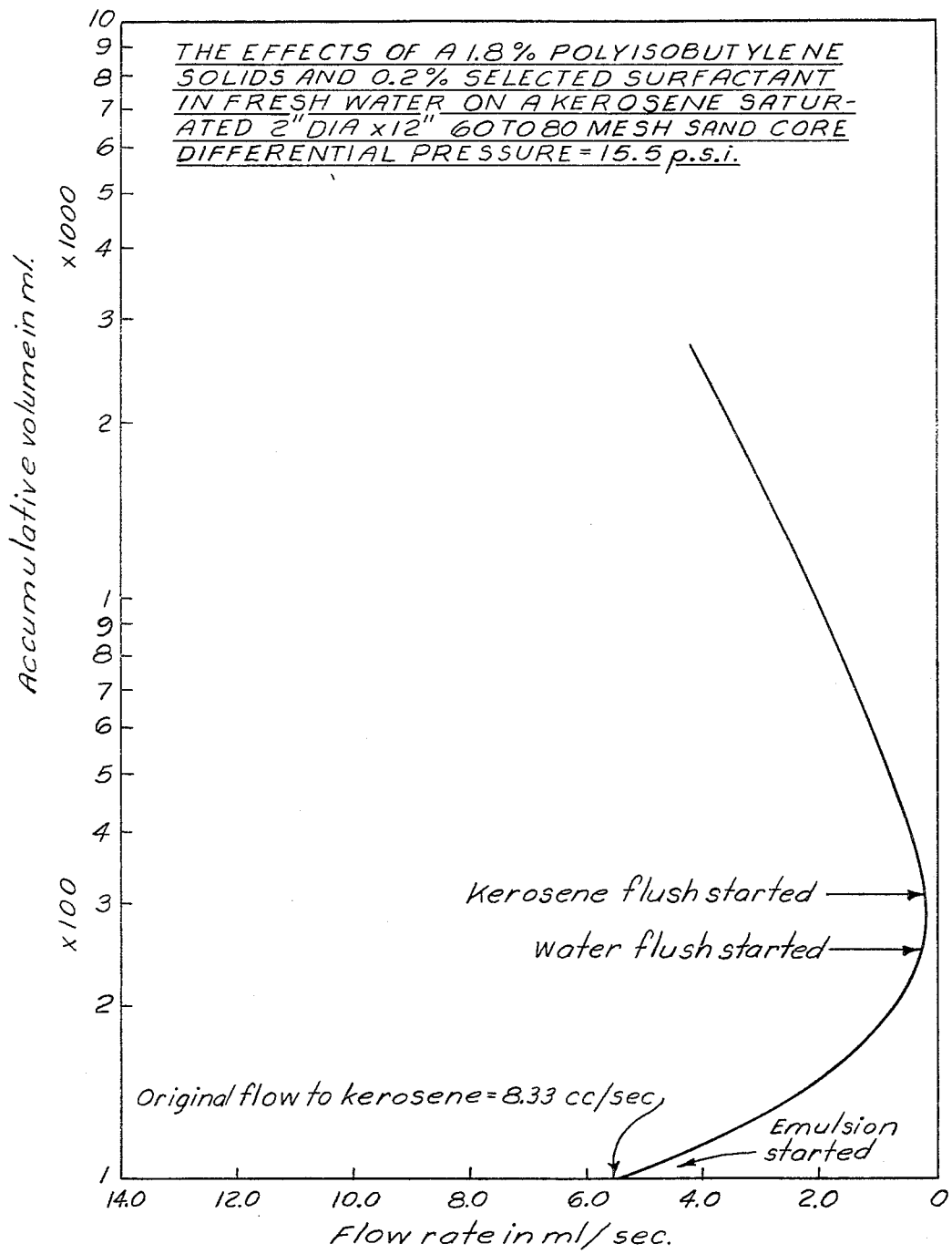

The invention relates generally to minimizing the undesirable flow of water or brine in an oil-bearing reservoir in a subterranean formation penetrated by a wellbore. It especially relates to a temporary selective shielding of the producing oil zone in the vicinity of the wellbore during a permanent plugging operation.

Stated somewhat differently, the invention is an improved method of providing a plug or shutoff, of short life, not only against water or brine intrusion from a zone containing it into an adjacent zone containing a hydrocarbonaceous fluid but of preventing entrance into the producing zone of a subsequetly injected settable permanent plugging fluid composition.

In many oil producing zones there is a water or brine stratum frequently underlying the zone of the crude oil sought to be produced and the water or brine tends to cone up into the producing zone adjacent the wellbore. The presence of water or brine materially increases the total cost of producing the desired oil because the water or brine tends to block off the oil flow. In some instances such cost and difficulties become so burdensome that it is uneconomical to continue operating the well.

In the face of the continuing problem associated with coning water or undesirable production of water or brine, a number of techniques have been utilized to lessen intrusion thereof. Such techniques are described in a relatively large number of U.S. patents, usually classified under Class 166 and sometimes under Class 175 in the U.S. Patent Office. Among such patents are 3,047,067; 3,044,- 548; 3,310,110; and 3,302,733.

However, known techniques have not been fully satisfactory for one or more reasons among which are: failing to effectuate adequate shutoff; rendering the producing reservoir insufficiently permeable; requiring a pressure for emplacement of the shutoff material which is so high that it tends to fracture the formation; and inability to place properly the shutoff material due to lack of control over it and to too great a viscosity. There is an especial need to protect producing intervals while a permanent plug is being emplaced.

The present invention meets the especial need of providing, easily and readily, a plug which is effective while a more permanent plug is emplaced in the formation.

The invention contemplates a method of selective plugging of passageways leading into oil zones by the expedient of injecting a two-phase emulsion thereinto which causes the oil in contact therewith to gel temporarily and thereby plug the zone but which gel shortly thereafter liquefied and dissipates, thus protecting the zone for a desirable time against entrance of the permanent plugging composition but which has not a lasting effect upon the permeability of the producing zone. The efficacy of the invention may be enhanced by flushing out the gelled composition when its presence as a plugging agent is no longer employed, by circulating a low viscosity organic liquid through the portion of the producing zone affected by the plug.

The outer or continuous phase of the dilute latex required to be used consists of an aqueous solution of a cationic surfactant (i.e., surface active agent) or preferably a combination of cationic and nonionic surfactants. This phase is substantially immiscible with the oil but due to the presence of the surfactants does emulsify or wet the oil to an extent sufficient to bring the inner phase liquid into intimate contact with the oil. The preferred amount of the outerphase to use is 0.025% to 2.5% aqueous solution of the surfactant.

The inner or discontinuous phase of a latex consists of a polymer or copolymer selected from the class consisting of polyisoprene or polyisobutylene, or mixtures thereof. Small amounts of related polymers may be present. The latex total solids may vary e.g., from about 20 to 75% by weight; 30% to 70% is more commonly employed. Such latices, acceptable for the practice of the invention, include butyl latices wherein at least 50% of the monomeric mix employed was isobutylene. The balance may be isoprene, butadiene or mixtures thereof. Traces of other latices may be tolerated. Anionic, nonionic, and amphoteric surfactants may be used as both mechanical and chemical stabilizers in the preparation of these latices. Anionic surfactants are widely used in these latices as stabilizers and also as wetting agents.

The preferred latex to employ is the polyisobutylene homopolymer which is substantially free of any solvents or plasticizers. The size of the particles in the latex to be used may vary from about 0.01 to about 10.0 microns, 0.04 to 3.0 often being the average size. The molecular weight may be from about 50,000 to 10,000,000, those between about 100,000 and 2,000,000 being commonly used in the invention. The latex used swells in ethers, esters, vegetable and mineral oils and greases. Upon first contact with petroleum it is swellable but, upon sustained contact therewith, it gradually dissolves.

The latices to be used are all commercially available, e.g. the preferred polyisobutylene polymers include those that are prepared by low temperature acid-catalyzed polymerization of isobutylene monomer. The polymer consists of linear repeating units of

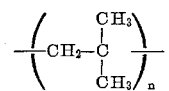

except terminal units, wherein $n$ is an integer which results in the molecular weight above stated.

Typical of available polyisobutylene latex for use in the practice of the invention is Oppanol B130, a 60% total solids aqueous dispersion having an average particle size of between about 1.2 and 4.4 microns.

The size of the latex particles is such that they pass effectively into the pores of the oil-bearing zone, the latter usually varying in size between about 0.1 and about 100 microns.

The presence of the surfactant in the outer phase not only serves to permit the polyisobutylene or other polymer employed to intermingle to an acceptable extent with the oil in the reservoir before gelation becomes pronounced, but it actually accelerates and promotes gelation and minimizes migration of (tends to immobilize) the gelled oil for the desired period of time. This is accomplished because the surfactant aids greatly in enabling the oil to come into contact with the isobutylene particles in the latex. This is referred to as stripping away the water and exposing the polymer to the oil.

The viscosity of the emulsion should be such that it will flow readily into the pores of the formation.

The preferred surfactants to employ are the cationic n-alkyl ammonium chlorides (e.g. the Arquad series) or such cationic surfactant together with a nonionic condensation product of an alkyl phenol and ethylene oxide (e.g. the Dowfax series). A particularly effective surfactant to use is the di-cocodimethyl ammonium chloride wherein the di-coco substitutents consist of two $C_{12}$ to $C_{18}$ alkyl groups which may be the same or different. The preferred nonionic surfactant, recommended to be used with the cationic surfactant, is that made by condensing ethylene oxide and nonyl phenol in a molar ratio of about 10:1, respectively. The emulsion used in the invention may be prepared by admixing between about 8 and 800 pounds of the polyisobutylene latex with about 8,300 pounds (1000 gallons) of water containing between about 5 to 25 pounds of surfactants.

A valuable embodiment of the invention is the practice thereof as a preliminary step to a permanent water shut-off operation. In such practice, the two-phase emulsion is first injected to penetrate the oil producing zone sufficiently to form a gel with the oil, at least at the periphery in the vicinity of the wellbore. This injection is preferably followed by a displacing water or brine. Thereafter the more-or-less permanent composition is injected into the water zone. This may be any known material, e.g. a brine polymer slurry according to U.S. Patent 3,306,870 or any one of patent applications: S.N. 548,134, filed May 6, 1966; S.N. 625,324, filed June 25, 1968, now Patent No. 3,421,582; S.N. 629,089, filed Apr. 7, 1967; or S.N. 583,452, filed Sept. 30, 1966, now Patent No. 3,432,437; a glycol-water polymer slurry according to S.N. 486,530, filed Sept. 10, 1965; or a brine-natural gum type of slurry according to S.N. 563,679, filed July 8, 1966; or it may be any known hydraulic aqueous cement slurry including Portland or aluminous cements or limes and/or expansive high sulfate cements. Shortly thereafter, e.g. within a few hours, the gel will have sufficiently dissolved and dissipated to put the well in production. Formation damage which can easily result from a plugging operation will be greatly lessened by the practice of the invention.

The annexed drawing consisting of FIGURES 1 to 5 shows the efficacy of the invention to close off fluid flow when the composition of the invention is emplaced and brought into contact with an oil in a space but permits fluid flow when prolonged contact with the oil is permitted, and particularly when a lightweight oil, e.g. kerosene, toluene, or the like, or a mixture thereof is used to flush the plugged space.

The following tests show the efficacy of the practice of the invention.

A solid porous test specimen was made by packing sand grains having a particle size of 60 to 80 mesh into a 2″-diameter, 12-inch long nipple, provided with a fine mesh screen to contain the sand but to permit fluid flow. The nipple was secured in an upright position connected in a closed system (except at the screen end of the specimen) to a pressure source provided with a gauge. A collecting means was provided at the outlet end of the specimen. A temporary plugging composition according to the invention was prepared as follows:

With the desired amount of water, were admixed: 1% by volume of a 60% by weight polyisobutylene latex (viscosity average molecular weight about 1.4 to $2.5 \times 10^6$ and average particle size between about 1.2 and 4.4 microns) and 0.2% by volume of a mixture consisting of 4 parts of dicocodimethyl ammonium chloride and 1 part of the condensation product of nonyl phenol and about ten moles of ethylene oxide.

The packed sand is then first wet with an oily liquid, e.g. kerosene, toluene, crude oil or mixtures thereof and then with the temporary plugging composition of the invention. Thereafter, the sand specimens were slushed with the same oily liquid that had been first used. The flow rate and volume of liquid used were ascertained at 15 pounds per square inch gauge pressure.

SERIES ONE

Table I below sets out the test results of one of the cores. The fluids employed and rate of flow and total quantity thereof through the core sample, are set out there. The results of this series are also shown graphically in FIGURE 1.

TABLE I

[Kerosene saturated core under 15 p.s.i.g. pressure]

| Type fluid | Flow rate in ml./sec. | Accumulative volume in ml. |
|---|---|---|
| Kerosene | 16.70 | |
| Emulsion of invention | 16.70 | |
| Do | 8.40 | 400 |
| Do | 0.19 | 625 |
| Do | 0.06 | 650 |
| Water | 0.0167 | 710 |
| Do | 0.011 | 800 |
| Kerosene | 0.011 | 860 |
| Do | 1.40 | 1,350 |
| Do | 1.67 | 1,500 |
| Do | 2.00 | 1,600 |
| Do | 2.20 | 1,700 |
| Do | 2.50 | 1,800 |
| Do | 2.90 | 1,900 |
| Do | 3.30 | 2,000 |
| Do | 3.30 | 2,100 |
| Do | 3.30 | 2,800 |
| 50/50 [1] of kerosene and toluene | 3.30 | 3,000 |
| Do | 16.70 | 4,800 |

[1] Ratio by Weight.

Reference to Table I and to FIGURE 1 shows how effectively the emulsion employed according to the invention plugs off and lessens the permeability of a rock formation and yet how completely the permeability if subsequently restored.

SERIES TWO

This series of tests was performed to show the efficacy of the process of the invention when crude oil follows the water into a sand specimen. The composition tested consisted of a 2.0% by volume 60% total solid polyisobutylene latex and 0.2% by volume of the surfactant employed in series one. The results are set out in Table II and in FIGURE 2.

TABLE II

[Kerosene saturated core 15 p.s.i.g. pressure]

| Type fluid | Flow rate in ml./sec. | Accumulative volume in ml. |
|---|---|---|
| Kerosene | 11.10 | |
| Emulsion | 11.10 | 0 |
| Do | 8.35 | 200 |
| Do | 0.10 | 290 |
| Do | 0.032 | 310 |
| Water | 0.032 | 315 |
| Do | 0.018 | 360 |
| Do | 0.05 | 485 |
| Do | 0.11 | 490 |
| Crude oil | 0.11 | 500 |
| Do | 0.14 | 690 |
| Do | 0.15 | 780 |
| Do | 0.18 | 800 |
| Do | 0.21 | 900 |
| Do | 0.25 | 1,030 |
| Do | 0.28 | 1,130 |
| Do | 0.29 | 1,230 |
| Do | 0.40 | 1,330 |
| Do | 0.59 | 1,690 |
| Do | 0.59 | 1,730 |
| 50/50 [1] kerosene and toluene | 0.63 | 1,830 |
| Do | 1.25 | 1,930 |
| Do | 2.00 | 2,030 |
| Do | 2.50 | 2,130 |
| Do | 3.40 | 2,255 |
| Do | 4.40 | 2,380 |
| Do | 5.00 | 2,480 |
| Do | 5.20 | 2,630 |
| 50/50 kerosene | 5.90 | 2,730 |
| 50/50 kerosene and toluene | 6.70 | 2,830 |
| Do | 7.10 | 2,930 |

[1] Ratio by weight.

Reference to Table II shows that the permeability can be reduced to a nearly negligible rate and subsequently restored to a satisfactory rate in accordance with the practice of the invention. When rapid removal of the temporary plug is desired, it is preferred to overflush the temporarily plugged zone with an efficacious solvent mixture, i.e. such as kerosene and toluene.

SERIES THREE

The composition employed in this series was a 3% by volume 60% total solids latex and 0.2% by volume of the surfactant used above in water. The pressure was 15 p.s.i.g. The results are shown graphically in FIGURE 3.

SERIES FOUR

Figure 4:
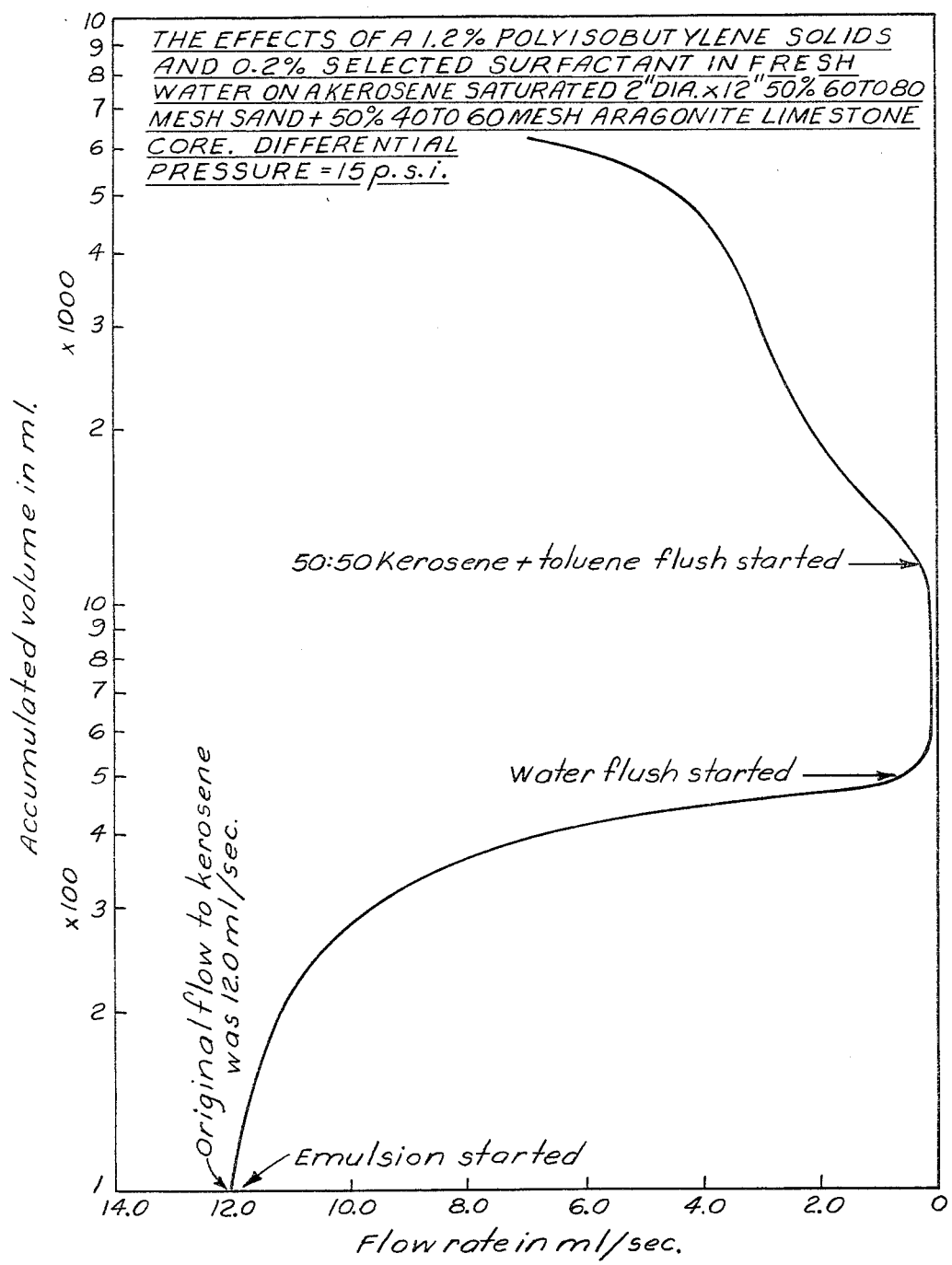

This series of tests was performed to show the efficacy of the invention on limestone-containing cores. The cores were of the same size as in the above series except that a 50/50 by volume mixture of sand and aragonite granules was packed into the test nipples. The results are shown in FIGURE 4.

SERIES FIVE

Figure 5:
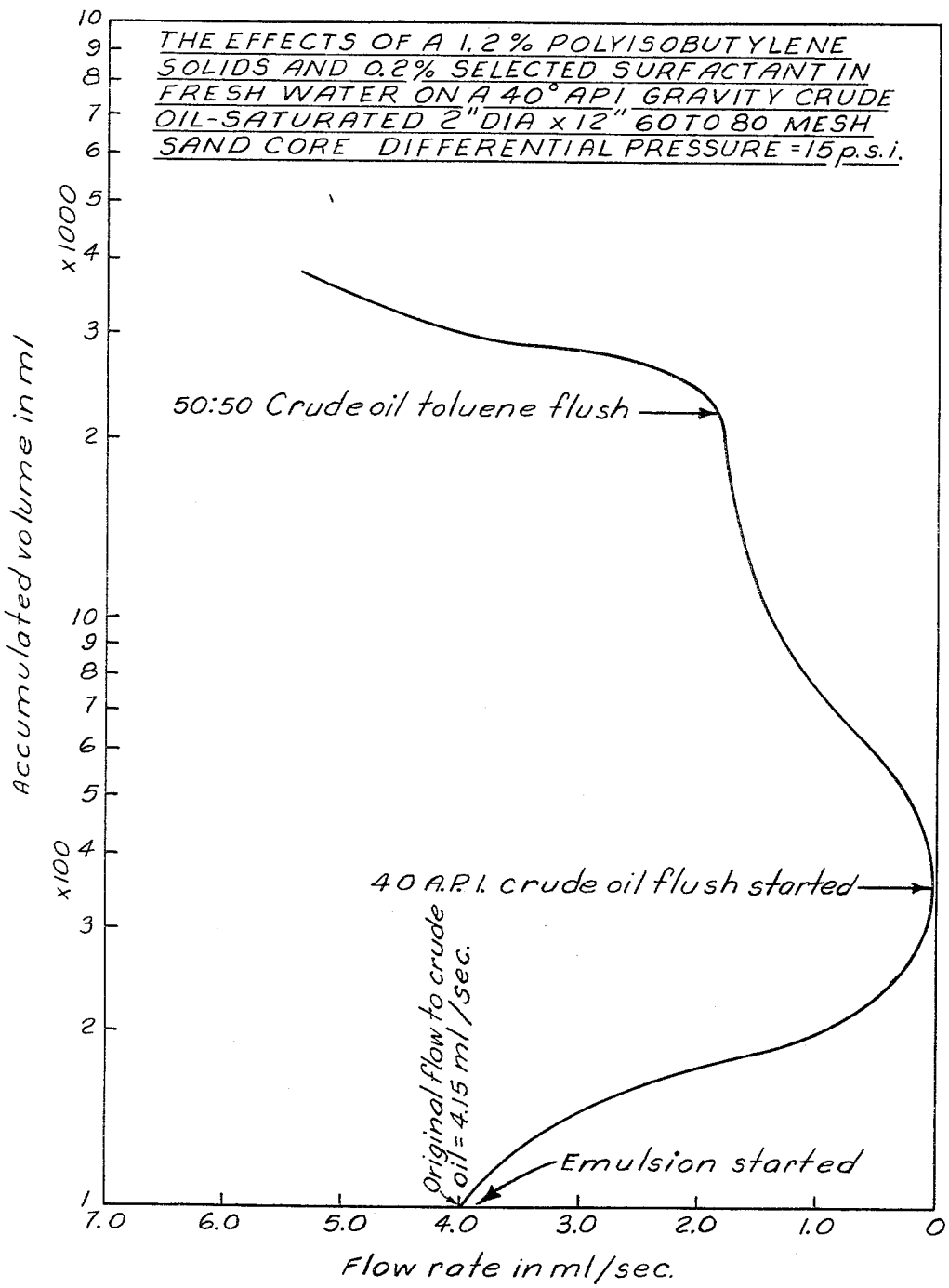

This series of tests was performed to demonstrate the efficacy of the practice of the invention when the treated sample was saturated with 40 API gravity crude oil. The results are shown in FIGURE 5.

Field Example A

The following steps are illustrative of the practice of the invention in an oil-bearing subterranean stratum penetrated by a wellbore.

The pore capacity of the oil-bearing stratum is estimated. Then the two-phase emulsion composition of the invention, e.g. in an amount sufficient to provide 2 parts total solids and a 0.1% to 0.5 part of a 4:1 solution of Arquad 2C from the Armour Company and Dowfax 9N9 from The Dow Chemical Company, is pumped down the wellbore to the level desired, employing conventional pumps, pipe lay-out, and properly located packers. The composition is thereafter preferably followed by a displacing liquid, e.g. water, in sufficient amount to displace the composition into the oil-bearing stratum. Thereafter, upon contact with the oil, the emulsion of the invention inverts phases (due to stripping of the water from the particles of polymer) and subsequently gels, at least the first contacted oil in the stratum. While the oil is so gelled, work-over jobs, squeeze cementing jobs, and other sealing jobs are performed. Preferably thereafter, especially if the oil is viscous low API crude, the well and producing stratum are cleaned up by circulating kerosene, or more preferably mixed with toluene, through the producing stratum.

More especially, in the practice of the invention, a chemical seal slurry, which provides a more-or-less permanent seal, comprising a glycol, water, a polyvalent metal salt and a polymer, e.g. polyacrylamide, according to S.N. 563,679, or a natural polymer such as starch according to the aforesaid S.N. 563,679, is pumped down and emplaced as desired, e.g. at the interface of a water stratum subjacent to the oil stratum, while the temporary plug effectively restrains entrance of the permanent seal slurry into the oil zone.

Having described our invention, what we claim and desire to protect by Letters Patent is:

1. The method of temporarily inhibiting fluid flow in an oil-bearing geologic formation which comprises emplacing, in the formation and into contact with oil at the locus where such inhibition is desired, a two-phase liquid system consisting essentially of (a) an outer continuous aqueous phase having dissolved therein a surfactant selected from the group consisting of cationic and mixtures of cationic and nonionic surfactants and (b) an inner discontinuous phase comprising a polymer latex selected from the group consisting of polyisobutylene and copolymers of isobutylene wherein at least half of the monomers employed in the preparation thereof were isobutylene and the balance was selected from the group consisting of isoprene and butadiene.

2. The method according to claim 1 wherein the inner discontinuous phase is a 20% to 70% total solids polyisobutylene latex and is present in said two-phase system in a volume ratio of between 0.1 and 10%.

3. The method according to claim 1 wherein the outer continuous phase is a 0.025% to 2.5% solution of said surfactant.

4. The method according to claim 3 wherein a mixture of the surfactants is employed, the cationic being present in a major proportion and the non-ionic in a minor proportion.

5. The method according to claim 4 wherein the cationic surfactant is a $C_{12}$ to $C_{18}$ alkyl dimethyl ammonium chloride and the non-ionic surfactant is a condensation product of an alkyl phenol and ethylene oxide.

6. The method according to claim 5 wherein the $C_{12}$ to $C_{18}$ alkyl substituent is dicoco and the nonionic surfactant is the condensation product of nonyl phenol and ethylene oxide in a molar ratio of about 1:10.

References Cited

UNITED STATES PATENTS

| | | | |
|---|---|---|---|
| 2,121,036 | 6/1938 | Irons | 166—294 |
| 2,300,325 | 10/1942 | Van Leeuwen | 166—294 X |
| 3,123,158 | 3/1964 | Gallus | 166—295 X |
| 3,251,414 | 5/1966 | Willman | 166—294 X |
| 3,312,296 | 4/1967 | Paramore et al. | 166—294 X |

NILE C. BYERS, Jr., Primary Examiner

I. A. CALVERT, Assistant Examiner